Sept. 29, 1959     E. L. MILLER     2,906,550
CAPTIVE COLLET, TIE-ON CONTROL KNOB
Filed Oct. 23, 1958
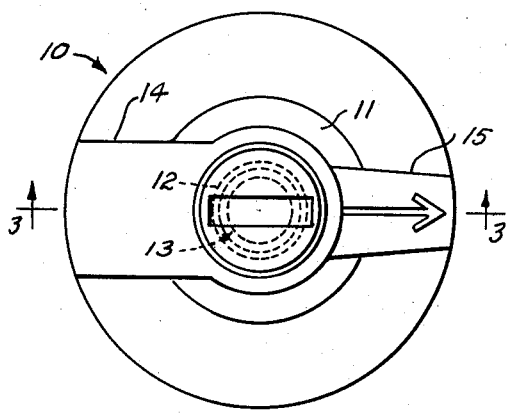
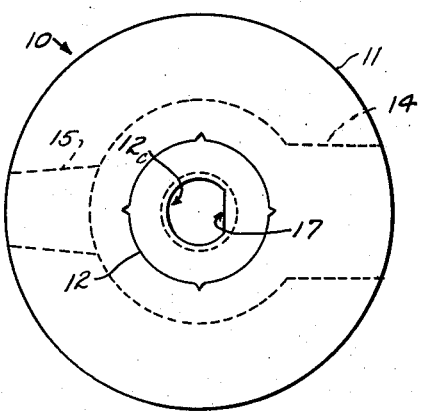
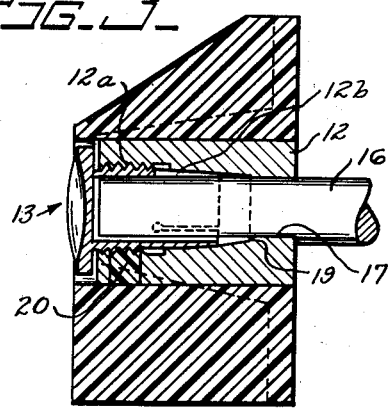
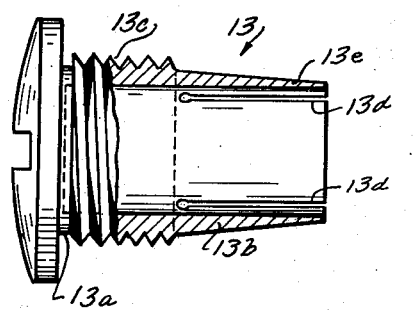
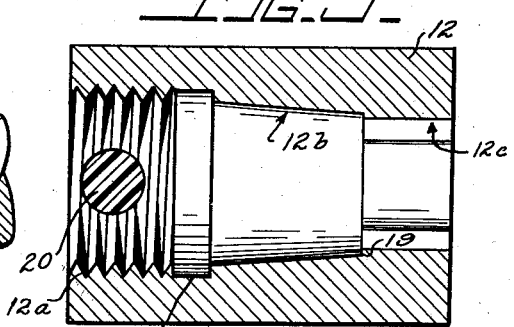
INVENTOR.
EDWARD L. MILLER
BY *Wade Koontz*
ATTORNEY
*Arthur R. Parker*
AGENT

United States Patent Office 2,906,550
Patented Sept. 29, 1959

2,906,550

CAPTIVE COLLET, TIE-ON CONTROL KNOB

Edward L. Miller, Fairborn, Ohio, assignor to the United States of America as represented by the Secretary of the Air Force Application October 23, 1958, Serial No. 769,270

1 Claim. (Cl. 287—53)

(Granted under Title 35, U.S. Code (1952), sec. 266)

The invention described herein may be manufactured and used by or for the United States Government for governmental purposes without payment to me of any royalty thereon.

This invention relates generally to a unique and yet effective mechanism for affixing a control knob to a control shaft and, more particularly, to a captive collet locking device for positively attaching the control knob to a control shaft.

In the adjustment of various equipment and devices utilizing, for example, a main control shaft with a control knob affixed thereto, it has been found more feasible and more practicable to use the flattened type of shaft which effects a more positive attachment to the control knob than with the use of the rounded type of shaft. Further, it has been found that by combining a flattened type of insert within the knob, as in the present invention, with the flattened type of control shaft, there is provided a definite and more positive attachment therebetween to prevent any slip of the knob on the shaft under substantial torque loads applied thereto.

It is an object of the present invention therefore to provide a control knob having a positive and yet simple attachment to a control shaft for the regulation of various devices and equipment.

It is a further object of the invention to provide a control knob incorporating a captive collet or socket for applying a substantial gripping force on the control shaft.

A still further object of the invention provides a simple control knob having means facilitating assembly to and release thereof from its control shaft when desired.

An additional object of the invention resides in a control shaft which is rugged in construction and yet involves a minimum of replaceable parts facilitating the assembly and disassembly thereof.

Another object of the invention resides in the provision of a positive tie-on control knob incorporating a tapered insert and a tapered collet adjustably positioned therein by a captive cap screw element.

Other objects and advantages of the invention will become apparent from the following description, taken in connection with the accompanying drawings, in which like reference characters refer to like parts of the several figures.

Fig. 1 illustrates a top view of the assembled control knob with the control shaft affixed thereto.

Fig. 2 is a bottom view of the assembled control knob of Fig. 1 with the control shaft removed and illustrating the bottom opening.

Fig. 3 is a cross sectional view taken about on line 3—3 of Fig. 1, illustrating additional details of the control knob of the present invention.

Fig. 4 is a blown up view partly in cross section and partly broken away of the combination cap screw and collet utilized with the device of the subject invention.

Fig. 5 is a cross sectional view as in Fig. 3 but revolved 90° therefrom to illustrate additional details of the tapered metal insert utilized with the present invention but with the basic control knob removed.

Fig. 6 is a blown up view of the shaft utilized with the inventive control knob, illustrating the flattened side thereof.

Referring more specifically to Figs. 1 and 2 of the drawings, the control knob assembly of the present invention is indicated generally at 10 as consisting of a basic control knob 11 made of plastic material, a metal insert 12, and a combination cap screw and collet indicated generally at 13. However, it is noted that said insert 12 may be made an integral part of control knob 11 as in the case of an all metal knob without departing from the spirit or scope of the invention. The basic control knob 11 incorporates a hand hold indicated at 14 and an index indicated at 15 for correctly adjusting the position of a control shaft indicated at 16 in Fig. 3 as desired. Moreover, it is clearly seen in Fig. 2 that the metal insert 12 incorporates a bottom opening portion 12c having one flat side indicated at 17 for purposes to be hereinafter explained in detail.

With specific reference to Figs. 3 and 5 of the drawings, it is seen that the metal insert 12 incorporates an opening extending longitudinally therethrough and having a straight upper threaded opening portion 12a, a tapered central opening portion 12b and the aforesaid straight lower or bottom opening portion 12c which opening extends from a relatively larger diameter at the top thereof to a relatively smaller diameter at the bottom thereof in communication with the aforesaid bottom opening 12c to form an internally arranged shoulder indicated at 19 which shoulder 19 provides an abutment or abutting surface for the bottom of the combined cap screw and collet 13. It is seen, therefore, that the combined cap screw and collet 13 when in its assembled position in the tapered central opening 12b of insert 12 surrounds and forms a socket for the shaft 16 assembled therein. Moreover, a plastic insert pellet 20 is assembled as shown in said Fig. 3 in one wall of the metal insert 12 for engagement with the combined cap screw and collet 13 to hold the latter in an adjusted position and prevent accidental release thereof from its engagement within the insert 12 due to vibration or other causes.

Referring more specifically to Fig. 4 of the drawings, the combined cap screw and collet 13 is shown in more detail as incorporating a slotted cap screw portion 13a and the tapered collet portion 13b formed integral therewith. Thus, the latter is referred to hereinafter as a "captivated" collet since it is formed as a single unitary element with the aforementioned cap screw portion 13a. The aforesaid cap screw portion 13a also incorporates the threaded portion 13c for engagement with the previously mentioned upper threaded opening portion 12a of metal insert 12 when in its assembled condition. An important feature of the aforesaid captivated collet portion 13b resides in the provision of a plurality of longitudinally disposed slots indicated at 13d which slots, of course, form said collet portion 13b into a plurality of relatively elongated, separate leg portions 13e facilitating inward movement and/or flexing thereof when pressure is applied thereto.

Referring again to Fig. 5 of the drawing, it is seen that the metal insert indicated at 12 incorporates the previously mentioned upper threaded opening portion 12a which engages with the threaded portion 13c of the cap screw portion 13a, a first straight opening portion indicated at 12b' as a continuation of the threaded portion 12a in order to permit proper seating of the cap screw portion 13a and then followed by the aforesaid tapered central opening portion 12b into which tapered opening portion flexible leg portions 13e of the collet portion 13b are engaged and pressed or flexed inwardly thereby in surrounding relation to and in positive engagement with the circumference of the control shaft 16 to hold the latter in its affixed position to the control knob 11 of the present invention. In addition, the previously referred to insert pellet, indicated in an enlarged condition at 20, which pellet 20 is, as hereinbefore stated, assembled in one wall of the combined cap screw and tapered collet 13, incorporates a threaded portion (note Fig. 3) in engagement with the upper threaded portion 13c of the cap screw portion 13a in order to retain the latter in an adjusted position when it has been released from its fully seated position relative to the shaft 16 or in any other position of adjustment. It is pointed out that the threaded portion of said plastic insert pellet 20 is preferably initially formed or cut therein by means of the upper threaded portion 13c of the cap screw portion 13a, engaging therewith on initial assembly of said combined cap screw and tapered collet 13 within the central opening of insert 12. In this manner, a much closer or "squeegee" or "interfering" fit is effected between the compressed threads cut into the plastic of said insert pellet 20 and upper threaded portion 13c. Furthermore, it is seen in Fig. 6 of the drawings that the aforesaid shaft 16 incorporates a flattened side indicated at 16a which flattened side engages the flat side 17 of the previously mentioned bottom opening portion 12c.

Thus a new and unique control knob assembly has been developed in which the aforesaid combined cap screw portion 13a and captivated collet portion 13b is engaged in the tapered metal insert 12 and screwed or adjusted into its fully seated position with the flexible leg portions 13e of collet portion 13b being compressed inwardly into surrounding positive engagement with the control shaft 16 assembled therein to provide a positive grip therearound and thus effect a positive hold between control knob 11 and said shaft 16 under a no-hand or vibration pull-off condition.

It is seen, therefore, that a simple and yet novel positive captive collet tie-on control knob has been developed wherein a knob with a flattened insert has been utilized to accommodate a single flattened control shaft together with the inventive combined cap screw and captivated collet assuring a no slip attachment therebetween.

I claim:

A control knob assembly comprising a control knob having a hand hold and an index positioned thereon and a central, longitudinally disposed straight opening extending therethrough, a metallic insert positioned within the central opening of said control knob and having a longitudinally extending, centrally disposed opening including a relatively enlarged diameter straight, internally threaded upper opening portion, a relatively reduced diameter, intermediate tapered central opening portion and a relatively small diameter straight, bottom flattened opening portion forming an internally arranged shoulder at the juncture between the tapered central opening portion and the bottom opening portion, a control shaft positioned within said metallic insert and having a flat side in contact with the bottom flattened opening portion thereof, a cap screw element positioned within said metallic insert in threaded engagement with the upper opening portion thereof, and a tapered collet element positioned in depending relation relative to said cap screw element and having a plurality of relatively elongated slots therein separating said collet element into a plurality of semirigid relatively elongated gripping leg elements in engagement within the intermediate tapered central opening of said metallic insert and compressed inwardly in rigid surrounding contact with said control shaft positioned within said insert, said collet element abutting said internally arranged shoulder, said metallic insert having a transverse opening in one wall thereof in communication with said cap screw element and a yieldable insert pellet positioned within the transverse opening in slightly overlapping relation to the upper opening portion of said metallic insert in yielding compressed threaded engagement with said cap screw element to prevent accidental release of said cap screw element and said collet element.

References Cited in the file of this patent
UNITED STATES PATENTS

| | | |
|---|---|---|
| 1,411,107 | Kaimer | Mar. 28, 1922 |
| 1,420,295 | Tait | June 20, 1922 |
| 1,491,342 | Eckhardt | Apr. 22, 1924 |
| 2,725,915 | Johnson | Dec. 6, 1955 |